Jan. 3, 1967  S. E. CARLTON  3,295,546
GATE VALVE FOR SCALE CONCENTRATED FLUID
Filed June 19, 1963  4 Sheets-Sheet 1
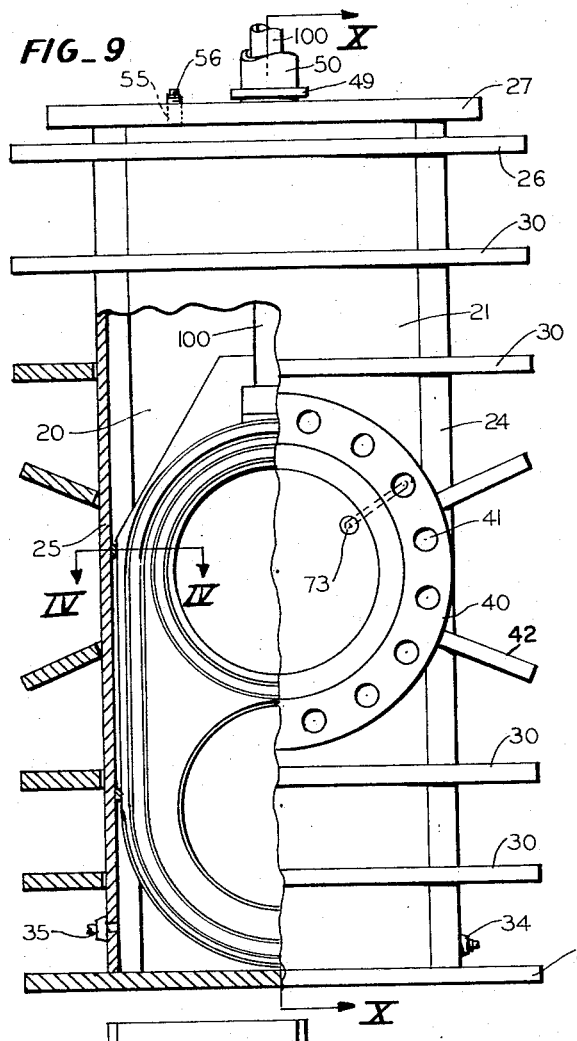
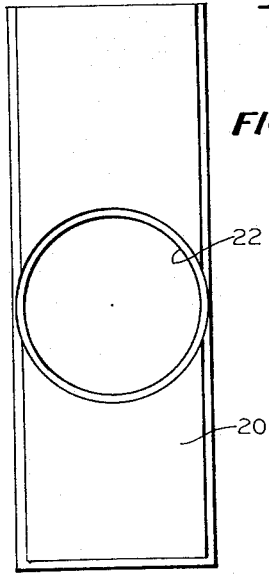
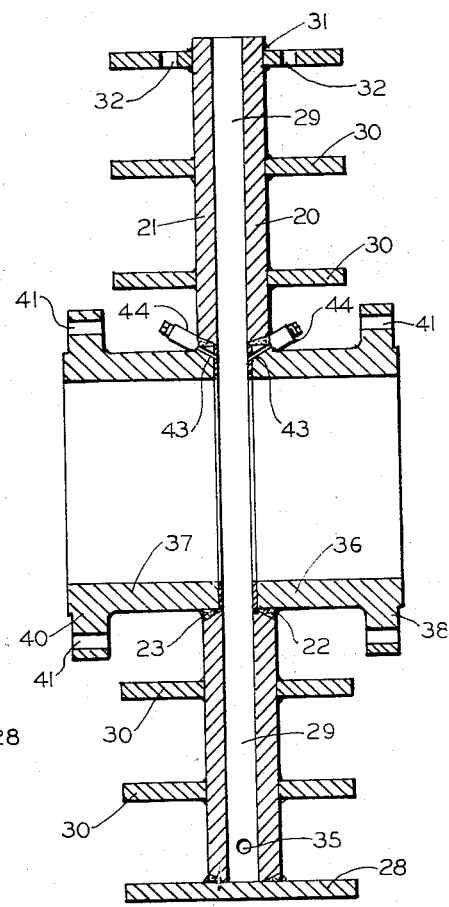
INVENTOR.
SYDNEY E. CARLTON
BY Jan. 3, 1967    S. E. CARLTON    3,295,546
GATE VALVE FOR SCALE CONCENTRATED FLUID
Filed June 19, 1963    4 Sheets-Sheet 2
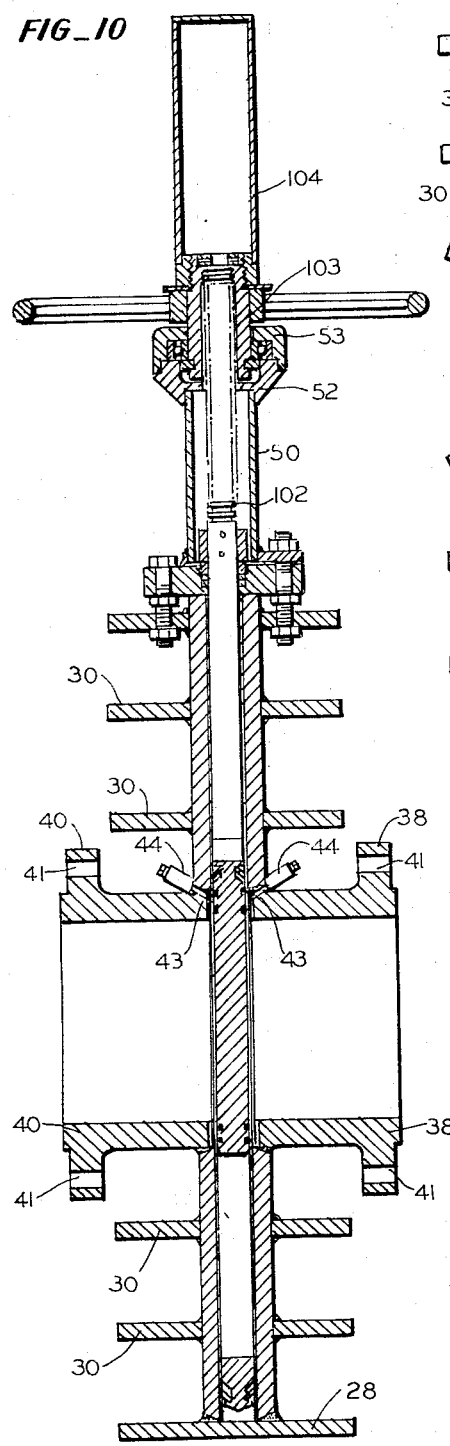
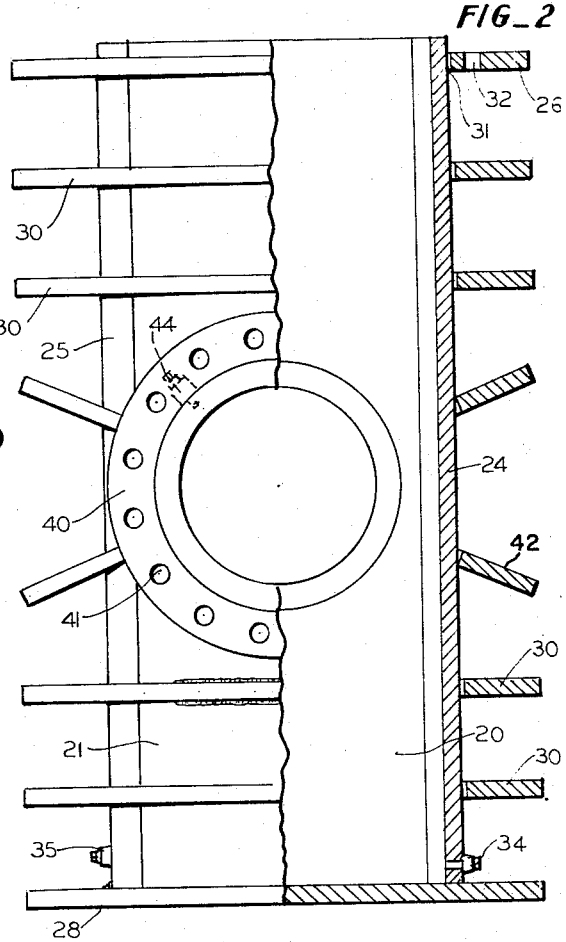
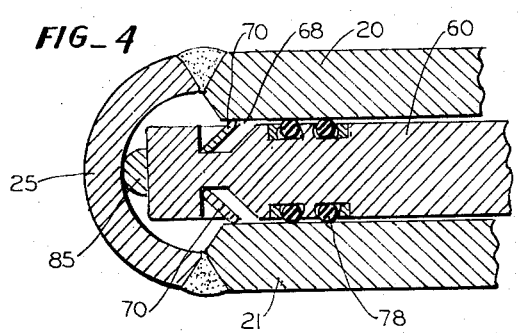
INVENTOR.
SYDNEY E. CARLTON Jan. 3, 1967  S. E. CARLTON  3,295,546
GATE VALVE FOR SCALE CONCENTRATED FLUID
Filed June 19, 1963  4 Sheets-Sheet 3
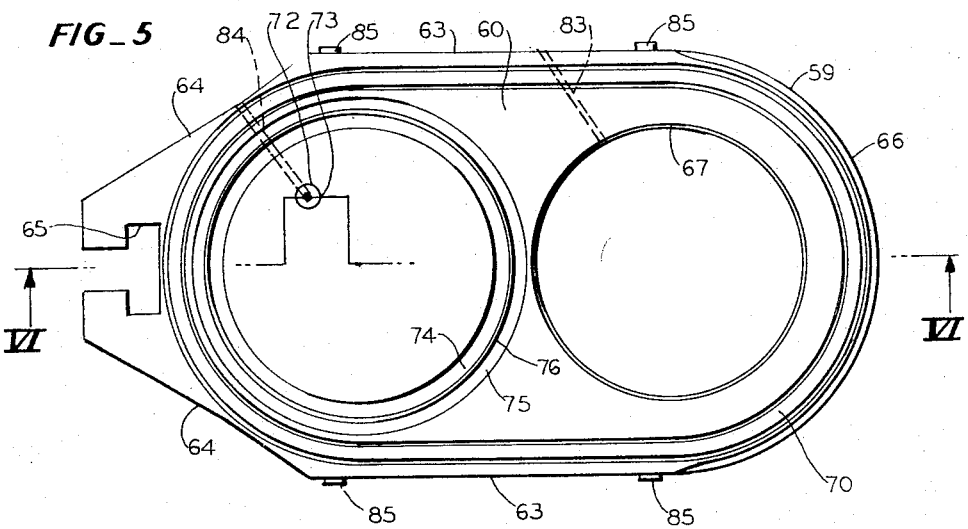
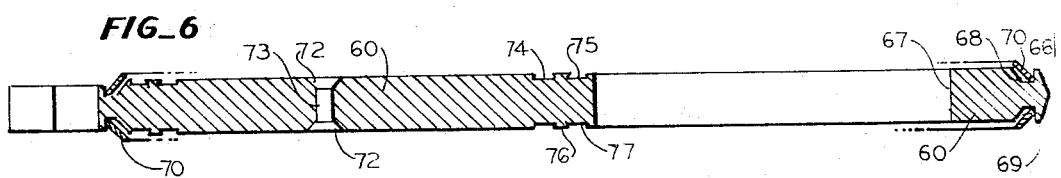
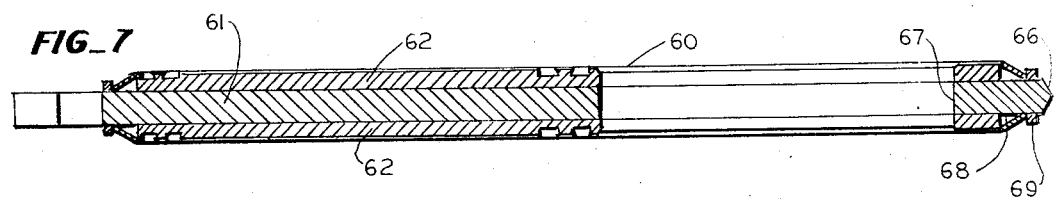
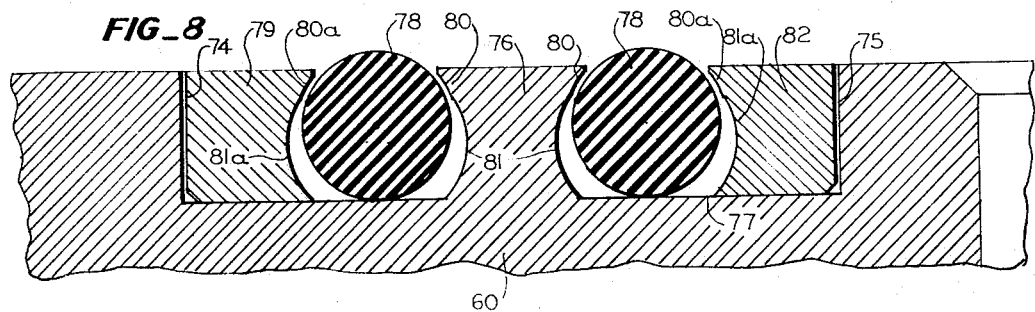
INVENTOR.
SYDNEY E. CARLTON
BY
*Henry Gifford Hardy*
Attorney.

Jan. 3, 1967 S. E. CARLTON 3,295,546
GATE VALVE FOR SCALE CONCENTRATED FLUID
Filed June 19, 1963 4 Sheets-Sheet 4
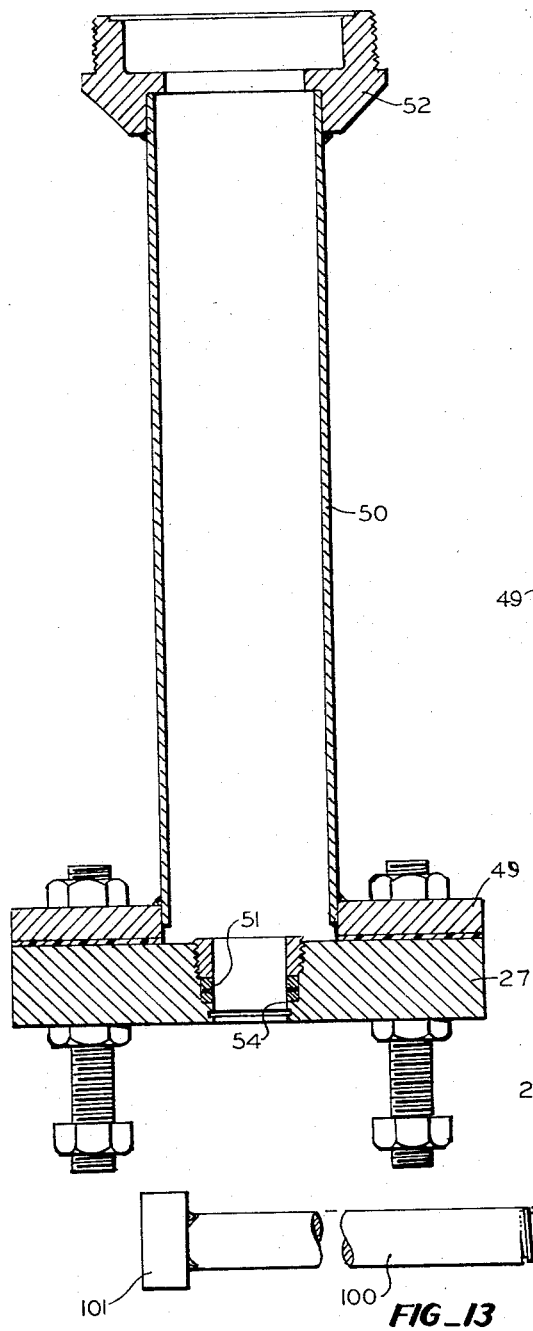
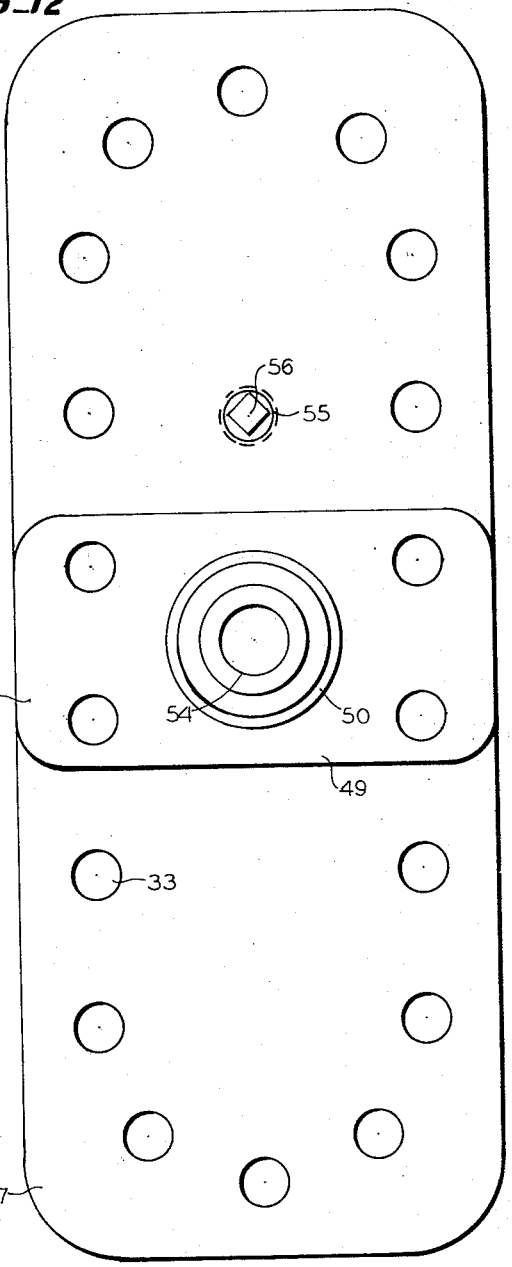
INVENTOR.
SYDNEY E. CARLTON

United States Patent Office 3,295,546
Patented Jan. 3, 1967

3,295,546
GATE VALVE FOR SCALE CONCENTRATED
FLUID
Sydney E. Carlton, 240 W. Hereford,
Gladstone, Oreg. 97027
Filed June 19, 1963, Ser. No. 289,051
4 Claims. (Cl. 137—242)

This invention relates to a pipeline gate valve and particularly to a one-piece knife type gate valve having numerous special features which will be disclosed and described herein. Valves of this character find particular usefulness in pipeline service and for refinery product service.

Because of the number of valves of this general type which are in use, the maintenance and servicing of such valves is a matter of constant concern and very substantial expense. One of the greatest factors in maintenance results from the handling of fluids containing high concentrations of common iron scale found in product storage tanks and in piping. Accordingly, it is an object of the present invention to provide a valve which is capable of handling fluids containing high concentrates of scale without affecting its operation.

Another object of the present invention is to provide a valve which is bubble-tight even at zero pressure providing a tight shut-off at all times and eliminating the use of blank flanges and blind flanges.

It is another object of the present invention to provide a valve with sliding sealing action where the seating rings will constantly readjust to accommodate the particular position involved.

Another object of the invention is to provide a gate valve which has an annular angled ring which contacts the interior body of the valve, which ring is also known as the Carlton ring.

It is a further object of the invention to provide an angular annular ring on the knife gate which is the only contact between the valve body and the gate, to accomplish smooth, even and easy operation, and provide for low temperature service since the ring will compensate for body cavity shrinkage, and at the same time accomplish a collection and holding means for scale and solids at all temperatures of operation.

Another object of the invention is to provide an annular angled ring for sliding engagement with the interior of the valve cavity which never passes over any part of the port.

One important object is the provision of a fabricated valve which when installed provides reliable operation for many months without any maintenance.

A still further object of the invention is the provision of a gate valve which is bubble-tight with a small body cavity making the valve available for multiple product use with a minimum of contamination.

Still another object of the invention is to provide a gate valve having a double O-ring sliding contact with the body cavity, only a portion of which is ever out of contact with the sealing surfaces, producing a maximum seal with a minimum of wear.

Still another object of the invention is to provide a double ring sealing system where the sealing O-rings are retained in specially shaped channels and retaining rings, producing an effective seal at all stages of operation and prologing the effective life of the sealing O-rings themselves.

Still another object of the present invention is to provide double block and bleed ports at any location in 360°, for the purpose of visually testing and making sure of the effectiveness of the seal and to make certain that there is no carry-over or contamination in multiple product use. The position of the bleed ports will vary in an arc of 360° depending upon the position of installation of the valve.

A still further object of the invention is the provision of a relief valve in the valve gate to relieve built up pressure resulting from product expansion due to temperature rise within the body cavity, and into the pipeline section selected by the user.

Another object is the provision of a valve where the stem can be checked and/or replaced while the valve is operating and without taking the valve out of the line.

Further objects are to provide a construction of maximum simplicity, economy and ease of assembly and disassembly, also such further objects, advantages and capabilities as will fully appear and as are inherently possessed by the device and invention described herein.

The invention further resides in the combination, construction and arrangement of parts illustrated in the accompanying drawings, and while there is shown therein a preferred embodiment thereof, it is to be understood that the same is illustrative of the invention and that the invention is capable of modification and change and comprehends other details of construction without departing from the spirit thereof or the scope of the appended claims.

Referring now to the drawings:

FIGURE 1 is a front elevational view of one of the main side plates for the valve body;

FIGURE 2 is a front view partially in elevation and partly in section of the fabricated valve body;

FIGURE 3 is a vertical sectional view of the valve body as fabricated;

FIGURE 4 is a transverse fragmentary section on an enlarged scale, of the valve body with the gate in position taken on the line IV—IV of FIGURE 9;

FIGURE 5 is a front elevational view of the valve knife gate;

FIGURE 6 is a vertical section of the single piece valve gate showing the Carlton ring;

FIGURE 7 is a vertical section similar to FIGURE 6 but showing a fabricated knife gate;

FIGURE 8 is a transverse section in enlarged scale showing the details of the O-ring mountings and retaining rings;

FIGURE 9 shows the valve partly in front elevation and partly in section with the knife gate in the closed position;

FIGURE 10 is a vertical section taken on the line X—X of FIGURE 9;

FIGURE 11 is a vertical section of the stem housing and yoke;

FIGURE 12 is a plan view of the support for the stem housing and access means to the interior of the valve; and FIGURE 13 is an elevational view of the stem.

Referring now to the drawings in more detail, it will be observed that the valve of the present invention is a fabricated valve having two facing body pieces 20 and 21. These are spaced from each other in parallel planes. Each has an identical port 22 and 23 therethrough, which correspond substantially to the size of the line to which it is to be placed in service. The two ports 22 and 23 register with and face each other in axial alignment. The valve body pieces 20 and 21 are held in the required spaced relation by splitting an appropriately sized tubing in half longitudinally. One half of the tubing is secured along the longitudinal marginal edges on one side 24, while the other is secured along the longitudinal marginal edges on the opposite side 25. It will be noted that a very narrow body cavity 29 is thus provided which results in a valve weighing considerably less than many valves of the same size presently available. A transverse head piece 26, cut with a central aperture 31 to conform to the exterior shape of the valve body is fitted over the top of the body with its upper surface below the top end of the body. It is provided with a plurality of through borings 32 which register with similar borings 33 in the bonnet 27. The head piece 26, which also functions as a reinforcing vane, is secured to the valve body by welding, or in any other suitable manner. A correspondingly shaped, but solid foot piece 28 fits over the bottom ends of the valve body and is secured thereto by welding, or in any other suitable manner. Before the head and foot pieces 26 and 28 respectively, are assembled in position, transverse reinforcing vanes 30 having central apertures conforming substantially to the outer configurations of the valve body, are arranged transversely and spaced along its vertical axis, above and below the ports 22 and 23. The reinforcing vanes or webs 30 which have an outer configuration similar to the head and foot pieces, are secured in their respective positions externally on the valve body. Just above the foot piece 28, pipe plugs 34 and 35 are placed in openings which pass through the curved side members 24 and 25.

Short sections of pipe 36 and 37 are secured in the ports 22 and 23 in axial alignment and project outwardly therefrom. The outer ends of these pipe sections 36 and 37 are provided with coupling flanges 38 and 40 which may be integral with or welded to the respective pipe sections. Each of the coupling flanges 38 and 40 has circumferentially spaced through bores 41 to secure the same to the pipe flanges in the line. U-shaped rib or valve reinforcing members 42 are arranged radially around the pipe sections, astride the valve body, with their open ends abutting and secured to the pipe sections 36 and 37.

At approximately 45° from the vertical and adjacent the circumference of the pipe sections 36 and 37 bleedholes 43 are drilled through the valve body and lead to pipe plugs 44. Since a leak-tight seal is provided by the valve for operation from zero pressure upwardly, it must hold at the difficult low pressures as well as the easier high pressures. The bleed holes may be positioned anywhere on an arc of 360° depending upon the positioning of the valve. 45° is for vertical positioning. The bleed is to test when a product is not passing the gate. The bleed when opened is always on the downstream side and indicates whether or not the seal is holding. The valve shown in the drawings being a two-way valve, bleed lines are shown on both sides of the gate.

The bonnet 27 is secured over the top of the valve body and above the head plate 26 and has a central aperture 54 in vertical axial alignment. The stem 50 and yoke housing 49 is mounted vertically on the bonnet 27 in precise axial alignment with both horizontal axes of the valve cavity so that the internal diameter of the stem housing registers with the diameter of the aperture 54 of the bonnet 27. Internally of the juncture is the stem packing and seal 51 which may be in any suitable form. Secured at the top of the stem housing 50 is the yoke and bearing housing 52, which preferably has a removable cap 53. It is to be understood that suitable bearings and gears are disposed within this housing for easy rotation of the stem and for guiding the same in its vertical travel. At a suitable place in the bonnet 27 is a through aperture 55 and a pipe plug 56. As shown, it is a relatively easy task to service the interior of the valve after the bonnet 27 is removed. While the valve is operating in the open position, the stem 100 can be examined or replaced without stopping the operation of taking the valve out of service.

Referring now to FIGURES 4 through 8, there is shown therein the two-way gate which moves vertically within the narrow cavity 29 of the valve body. The gate designated 60 generally, is composed of a single plate (see FIGURE 6). It may also be built up in several pieces such as is shown in FIGURE 7. When the gate is built up the knife plate 61 is in the center and is flanked on each side with floating plates 62 secured thereto to form the gate 60. As is conventional, the gate 60 moves in a vertical plane from the closed to the open positions and vice versa.

The gate plate 60 is a flat plate having parallel vertical sides 63 which at the top portion slope inwardly and upwardly to form sloping sides 64. At the top vertical center is a cut-out inverted T-shaped section 65. The open cross portion receives and retains the rectangular head 101 of the valve stem while the open channel portion permits the stem 100 to pass upwardly therethrough. The bottom of the plate 60 is curved in the arc of a circle concentric with the port opening as at 59. From a point adjacent the bottom about where one of the sides 64 starts curving and continuing downwardly around and upwardly to a diametrically opposite point on the other side 64, the plate 60 is beveled or angled on both sides, as at 66. Inwardly of the bevel and in the lower portion of the plate 60, is a port or circular opening 67 which is substantially the same diameter of the pipeline to which the valve is to be connected. The port 67 is also of substantially the same diameter as the pipe sections 36 and 37 which are secured to the openings 22 and 23 in the valve body. Above the port 67 is a similar area which is closed. The valve gate 60 has a peripheral groove 68 which terminates in an outward flange 69. Retained within the groove 68 is an elliptical ring 70. Ring 70 is semi-circular at top and bottom but has parallel sides. The ring 70 bears against the flange 69 and is angled upwardly and inwardly at an angle of substantially 45°. Its exposed edge 71 extends beyond the outer face of the plane 61 and when in position within the valve cavity 29 it is intended for constant rubbing or wiping contact with the inner faces of the valve body. The rig 70 is the Carlton ring and is a unique feature of this valve. Because the semi-circular portions of the Carlton ring 70 have a diameter greater than the port 67, the ring never passes over any part of the opening or port of the valve.

In the area above the port 67 and on both surfaces of the gate plate 60 are two concentric grooves 74 and 75 for circular O-rings. The inner groove 74 is larger in diameter than the diameter of the port 67 and the outer groove 75 is still larger in diameter. Between them is an annular island 76 which is of very important usefulness and shape. (See FIGURE 8 for enlarged deail.) It will be observed that the grooves 74 and 75 have flat bottoms 77 with the inner wall of the groove 74 being vertical and the outer wall of the groove 75 also being vertical. The walls of the island 76, however, are cut concave, more particularly shown in FIGURE 8. As will be observed from FIGURE 8, the O-rings 78 when seated in the grooves 74 and 75 project beyond or above the surface of the gate plate 60. The entrance portion to the island between the grooves is cut at 80 on the same radius as the radius of the O-ring. This radius continues only for a short distance in the depth of the grooves and the remainder is cut on a larger radius 81 with a different and lower center. Retainer rings 79 and 82 are shaped so as to be at the same depth as the grooves 74 and 75 but with their inner faces cut on radii 80a and 81a to conform with the curves 80 and 81 of the island opposite thereto. In this manner, the lips of the grooves and the retaining rings will not cut into the O-rings 78, and exposes only a small portion to possible damage by foreign particles. The O-ring grooves, the shape and the manner of locking them in position are particular features of the present invention and contribute to its effectiveness as a smooth operating and bubble-tight seal at all times.

A small bleed-port 83 is drilled angularly radially from the port 67 to the perimeter of the gate plate 60. There is also a small relief port 84 which runs from a counterbored area 72 in the face of the gate plate to the shoulder 64 thereof. The counter-boring 72 receives and retains the relief valve 73.

The vertical sides 63 of the gate plate 60 are provided with spaced islands or pads 85, which guide along the inner faces of the body sides 24 and 25, and take up any lateral movement.

The vertical movement of the gate valve assembly 60 within the body is accomplished by a valve stem 100 which has a rectangular head 101 secured to its inner end which head fits within and is retained by the inverted T-shaped slot 65 at the top of the gate valve assembly 60. The upper portion of the stem 100 is threaded with standard acme threads. In the assembled position, the stem 100 passes vertically up through the chamber 29, head plate 26, through hole 54 in bonnet 27 and is protected by the stem housing 50. As stated earlier, it passes up through packing 51 which is fire resistant. Its threads 102 engage the rotatable yoke 103 which is rotatably retained in the yoke housing 52 and cap 53. The yoke 103 is rotated by any conventional means, such as a hand wheel 105. As the stem 100 is raised vertically, its upper end is exposed within a clear plastic stem cover 104 which is secured immediately above the yoke housing, which cover protects it from damage and contamination.

OPERATION

The operation of the gate valve so far as raising and lowering is concerned, is similar to any other gate valve in that it provides a full opening and a full closing. However, in so doing it accomplishes a bubble-tight seal on both sides from zero pressure to pressures in excess of 275 p.s.i. The operation of the valve provides a tight shut-off at all times. The seal is so effective that bubble-tight operation can be assured for long periods of use without maintenance, even of the order of one year or more.

The Carlton rings 70 seat the faces of the gate plate and together with the double O-rings make it bubble-tight at zero pressure. This is the optimum performance for such valves. During the entire operation and use of the valve, the Carlton rings are in continuous contact with the inner surface of the body plates 20 and 21 and maintain a continuous contact preventing damaging quantities of dirt, silt, scaling or corrosive material from entering the main valve cavity. Most of such material is retained by the Carlton ring and is then passed on in the line at the next opening. Only a negligible quantity of such material actually finds its way into the valve cavity, and this is easily removed and handled. Since the Carlton rings never pass over any part of the valve opening, they retain their operative benefits at all times.

The sealing O-rings 78 only pass over the ports along their bottom halves only, since they are located to function only when the valve is required to be in the sealed or closed position. Because of this, and because of the fact that the O-ring grooves and their retaining rings, are shaped to prevent the groove lips from cutting into the O-rings and prevent O-ring damage from foreign particles, the life and usefulness of the O-rings is greatly prolonged.

The double block and bleed feature releases very small quantities of the material in the line through the bleeder so that only a small portion of the product is retained between the two O-rings on the outer face of the gate plate. This is a practical elimination of fire hazards, air pollution and product waste common to other valves utilizing a double block and bleed feature. Because of this the double block and bleed feature of the present valve qualifies this valve for use by the armed services without the use of blank flanges and blind flanges.

An additional feature is that the inner surfaces of the valve cavity 29 are preferably impregnated with "electrofilm," a solid film lubricant containing molydisulfide and graphite baked on at 400° F. This provides a permanently lubricated surface along with protection against galvonic corrosion, and provides a surface which is unaffected by solvents or petroleum hydrocarbons. Such a surface insures ease of operation and avoids any possibility of galling or sticking.

When the gate members are in the fully open or fully closed position and pressure continues so that the O-ring seals make the valve cavity a sealed pressure vessel, the situation is potentially dangerous. To avoid build up of any excess pressure, an automatic relief valve 73 is provided to release the same to the line. This is true regardless of the reason for the build up of excess pressure. The automatic pressure relief valve is located near the top section of the gate plate. The relief valve shown is drilled into the gate plate so as to discharge into the main valve port. The main valve port hole in the gate plate is drained to relieve into the body cavity which in turn relieves through the relief valve. This insures safe operation.

The faces of the gate are machined to tolerances of $25/1000$ to $1/16$ which keeps the Carlton rings 70 in constant contact with the cavity faces. Accordingly, should a fire destroy the O-ring seals, the rings will still provide the seal and prevent the valve from feeding the fire.

While the valve of the present invention is not to be considered a fast-acting valve, nevertheless, the valve operation is so smooth and even that there is considerable latitude in the speed of its operation. Wheel opening and closing, whether horizontal or vertical wheels are used, can be slow or if more rapid opening and closing is desired, this can be accomplished by increasing the speed of the rotation of the wheel. In this manner optimum operation for any particular service may be utilized.

I claim:

1. A knife gate for a gate valve comprising a gate member having a through port adjacent the bottom thereof adapted to register with a pipe opening of a valve in the open position, and a solid portion above the port adapted to close off the pipe opening in the closed position, a groove semi-circular at both top and bottom with parallel sides adjacent the marginal edge of said gate member encircling both the through port and the closing area, a ring retained within said groove, said ring being angularly disposed with respect to the plane of the gate member outwardly and inwardly and adapted for resilient sliding engagement with the face of the valve chamber and means at the top thereof for receiving and loosely retaining the shaped end of a valve stem.

2. The knife gate of claim 1 with a concentric groove of greater diameter than the flow through opening, in the face of the solid portion thereof and on the same side as the angularly disposed ring, and an O-ring mounted in said groove for watertight sealing in the closed position.

3. The knife gate of claim 1 with a relief valve in the solid area which is adapted to be exposed to the flow in the closed position and an interior passage connecting the relief valve to the upper periphery of the gate.

4. The knife gate of claim 1 wherein the gate member is composed of a plurality of suitably shaped plates secured together in laminated form.

References Cited by the Examiner

UNITED STATES PATENTS

| | | | |
|---|---|---|---|
| 2,401,129 | 5/1946 | Arnold | 137—244 |
| 2,861,771 | 11/1958 | Bryant | 251—174 X |
| 2,873,086 | 2/1959 | Bryant | 251—326 X |
| 2,982,295 | 5/1961 | Williams | 137—242 |
| 2,982,514 | 5/1961 | Bryant | 251—329 |
| 3,002,525 | 10/1961 | Grove | 137—242 |
| 3,013,770 | 12/1961 | Anderson | 251—329 |
| 3,204,929 | 9/1965 | Bryant | 251—329 |

ALAN COHAN, *Primary Examiner.*

CLARENCE R. GORDON, WILLIAM F. O'DEA,
*Examiners.*